(12) United States Patent
Saggio et al.

(10) Patent No.: US 10,356,519 B2
(45) Date of Patent: *Jul. 16, 2019

(54) AUDIO MONITOR SIGNAL INTERCEPTION DEVICE

(71) Applicant: Logitech Europe S.A., Lausanne (CH)

(72) Inventors: Joseph A. Saggio, Anaheim Hills, CA (US); Michael Andrew Dias, Irvine, CA (US); Philippe Depallens, San Clemente, CA (US)

(73) Assignee: LOGITECH EUROPE S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,706

(22) Filed: Nov. 27, 2017

(65) Prior Publication Data

US 2018/0091899 A1 Mar. 29, 2018

Related U.S. Application Data

(63) Continuation of application No. 14/962,462, filed on Dec. 8, 2015, now Pat. No. 9,949,026.

(51) Int. Cl.
| | |
|---|---|
| *H04B 1/00* | (2006.01) |
| *H04R 3/00* | (2006.01) |
| *G06F 3/16* | (2006.01) |
| *G10L 25/48* | (2013.01) |

(52) U.S. Cl.
CPC .............. *H04R 3/005* (2013.01); *G06F 3/16* (2013.01); *G10L 25/48* (2013.01); *H04R 2420/01* (2013.01)

(58) Field of Classification Search
CPC ..... H04R 3/005; H04R 2420/01; G10L 25/48; G06F 3/16
USPC .................................................. 381/118–120
See application file for complete search history.

(56) References Cited

U.S. PATENT DOCUMENTS

| | | | |
|---|---|---|---|
| 8,194,839 B2* | 6/2012 | Lopez ..................... | H04W 4/00 379/201.12 |
| 8,194,893 B1* | 6/2012 | Lewis .................. | H03G 3/3005 381/118 |
| 9,355,629 B2* | 5/2016 | Burmas ..................... | G10H 1/44 |
| 9,949,026 B2* | 4/2018 | Saggio ................... | H04R 3/005 |

* cited by examiner

*Primary Examiner* — Xu Mei
*Assistant Examiner* — Ammar T Hamid
(74) *Attorney, Agent, or Firm* — Patterson & Sheridan, LLP

(57) ABSTRACT

The present disclosure generally provides an apparatus and method of providing a performer with a desired combined mix of one or more performer's voices, instruments and/or music tracks with minimal or no overall effect on the setup of the sound system in a venue, such as a concert venue, recording studio or other type of musical gathering in which the performer is performing. The disclosure provided herein generally includes the use of an audio signal intercepting device that is inserted within and/or coupled to a portion of a sound system at a venue to provide the performer with a desired custom monitor mix of one or more performer's voices, instruments and/or music tracks.

18 Claims, 7 Drawing Sheets

AUDIO MONITOR SIGNAL INTERCEPTION DEVICE

CROSS-REFERENCE TO RELATED APPLICATIONS

This application is a continuation of co-pending U.S. patent application Ser. No. 14/962,462, filed Dec. 8, 2015, which is hereby incorporated herein by reference.

BACKGROUND

Field

Embodiments of the present disclosure generally relate to audio devices that are used to enable the presentation of live music performances, and methods of using the same.

Description of the Related Art

During live performances musicians and performers generally have a need to hear themselves and other band members in order to stay in-time and/or in-tune. Historically open speakers called floor wedges, or simply wedges, have been used to provide a combined mix, or "monitor mix," of the performers voices, instruments and/or music tracks in order for the performers to hear other pertinent audio during a performance at a venue.

FIG. 1 is a schematic diagram that illustrates a venue 100 in which a performer 101 is setup to perform to an audience 102. The concert venue 100 generally includes a plurality of wedges 110, one or more house speakers 120, and a sound mixing board 130. The concert venue 100 also contains various audio sources that include one or more performer microphones 145 and one or more instrument inputs 140 that are in communication with the sound mixing board 130. Typically, the audio signals derived from the one or more performer microphones 145 and one or more instrument inputs 140 are used to form the monitor mix that is delivered to the one or more of the wedges 110 via an output connection found in the mixing board junction box 135 of the mixing board 130 during the live performance. The one or more instrument inputs 140 may include audio signals generated by one or more audio devices that are able to receive sound or other input from an instrument. In one example, an instrument, such as a guitar 141 or microphone 143 positioned to receive sound generated by the instrument, and provide an audio signal to the mixing board 130 through the junction box 135 and cables 131 (e.g., cable snake). The one or more instrument inputs 140 are generally configured to generate an audio signal that can be received and processed by the sound mixing board 130 or other similar device for use in the generation of sound that is delivered to the audience through the house speakers 120 or a monitor mix delivered to one or more of the performers through one or more of the wedges 110. The sound mixing board 130 is thus a source of the sound that is delivered to the audience through the house speakers 120 and the monitor mix that is delivered to the performers through the wedges 110.

The electrical circuit that is configured to provide the monitor mix to the performer(s) via the one or more wedges 110 is referred to herein as the audio monitoring circuit, such as the conventional audio monitoring circuit 106 shown in FIG. 1. In one example, the audio monitoring circuit 106 includes the circuit elements (e.g., cables, wires, drivers, connecting elements, etc.) that are able to deliver the monitor mix from the mixing board 130 to the various wedges 110. In some configurations of the audio monitoring circuit, the wedges 110 receive a speaker level input signal (e.g., amplified signal) that is generated by amplifying the monitor signal provided by the mixing board 130 using an amplifier 107. Alternately, in some configurations of the audio monitoring circuit, one or more of the wedges 110 receive a line level input signal (e.g., unamplified signal) that must be amplified by an amplifier (not shown) found in each of the wedges 110 to provide the monitor mix to a performer 101. In one example, the audio monitoring circuit 106 includes cables 131, one or more connecting components in the junction box 135, the optional amplifier 107, input wiring 108, a first wedge 110A, interconnect wiring 111 and a second wedge 110B, as shown in FIG. 1.

In some conventional configurations, one or more of the performers 101 may separately receive their own monitor mix through an in-ear monitoring system 150. The in-ear monitoring system 150 may include an ear bud 156 and a controller 155 that is able to receive a monitor mix signal from the mixing board 130 via a communication link 154 (e.g., cable) and deliver it to the ear bud 156 via a communication link 157. Such a system may include a mixing device that is worn by the musician, for example, on a belt around the musician's hips, and includes an audio output for providing an audio signal to the musician through the ear bud 156. Conventional systems of this type require the use of multiple cables and wires to accomplish in-the-ear monitoring.

The process of setting-up the wedge(s) and/or in-ear-monitoring system(s) for each musician requires a significant amount of time due to the need to adjust the sound levels, equalization levels and audio content (e.g., instruments and singers) that each musician wishes to receive during the performance. In smaller concert venues, multiple acts, which typically perform one after another, may need to use the same, or "standard," monitor setup. The required use of a single monitor setup is usually due to the limited time that is allowed each performer to setup the monitor mix and/or make it easy for the sound engineer or venue to setup of the sound system. However, the use of a standard monitor setup often doesn't allow each musician to receive a desired "monitor mix" during the performance.

Accordingly, there is a need for an improved method and system for providing a monitor mix to a performer that solves the problems described above.

SUMMARY

The disclosure provided herein generally includes the use of an audio signal intercepting device that is inserted within and/or coupled to a portion of a sound system at a venue to provide the performer with a desired custom monitor mix of one or more performer's voices, instruments and/or music tracks.

The present disclosure also generally includes an audio signal intercepting device, comprising an input port configured to receive an input signal from an audio source that is coupled to an audio monitoring circuit, a signal combining element that is configured to receive the input signal from the input port and generate an output signal that is derived from the received input signal, an output signal delivering element that is configured to transmit the generated output signal to an audio output device, and an impedance controlling element. The impedance controlling element may include a switch that comprises an input connection point and a first output connection point, wherein the input connection point is coupled to the input port, and a resistive element that is coupled between the first output connection point and the ground. The switch being configured to selectively couple the input connection point can to the first output connection point. The audio monitoring circuit may have a first impedance between the audio source and a ground when the audio monitoring circuit includes one or more first audio output devices and is not coupled to the input port. The impedance controlling element may also be configured such that the impedance of the audio monitoring circuit does not significantly change from the first impedance value when the input port is coupled to the audio monitoring circuit and the input connection point and first output connection point are in electrical communication. In some embodiments, the impedance controlling element is coupled in parallel with a first impedance (e.g., resistance $R_{W1}$ in FIG. 2D) of the audio monitoring circuit, wherein the first impedance forms at least a part of the first impedance value.

The present disclosure may also include a method generating a custom monitor mix audio signal that is provided and/or used by a performer at a venue. The method may include connecting an audio signal intercepting device to a portion of a sound system at the venue, wherein connecting the audio signal intercepting device comprises connecting a first cable that comprises a signal transmitting conductive element that is configured to provide a monitor mix signal to a first connection port of the signal intercepting device, and selecting a first switch setting in a first switch in an impedance controlling element within the audio signal intercepting device, wherein the first switch setting couples the signal transmitting conductive element to ground through a first resistance. Then, transmitting at least a portion of the monitor mix signal to an audio output device that is configured to deliver an audio output to the performer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally provides an apparatus and method of providing a performer with a desired combined mix of one or more performer's voices, instruments and/or music tracks with minimal or no overall effect on the setup of the sound system in a venue, such as a concert venue, recording studio or other type of musical gathering in which the performer is performing. The disclosure provided herein may include the use of an audio signal intercepting device that is inserted within and/or coupled to a portion of a sound system at a venue to provide the performer with a desired custom monitor mix of one or more performer's voices, instruments and/or music tracks. In some embodiments, the audio signal intercepting device is inserted within and/or coupled to one or more of the monitor signal connections within an audio monitoring circuit of the sound system to provide the performer with a desired custom monitor mix.

In some configurations, the presence of the audio signal intercepting device within the audio monitoring circuit may make it desirable to remove one or more of the original monitors (e.g., wedges) from the audio monitoring circuit, since they are unwanted, unnecessary or have become redundant, due to the delivery of a new combined mix to the performer by components within the audio signal intercepting device. In this case, the audio signal intercepting device may include one or more impedance controlling elements that are configured to maintain a desired impedance to ground within the audio monitoring circuit when the audio signal intercepting device is inserted within a portion of the audio monitoring circuit. The impedance controlling elements may be especially useful when one or more of the original monitors (e.g., wedges) are removed or disconnected from the audio monitoring circuit that configured to receive a speaker level input. However, the impedance controlling elements may also be useful to prevent the insertion of the audio signal intercepting device within other parts of a sound system at a venue from affecting the previous setup of the original sound system components.

Figure 2A:
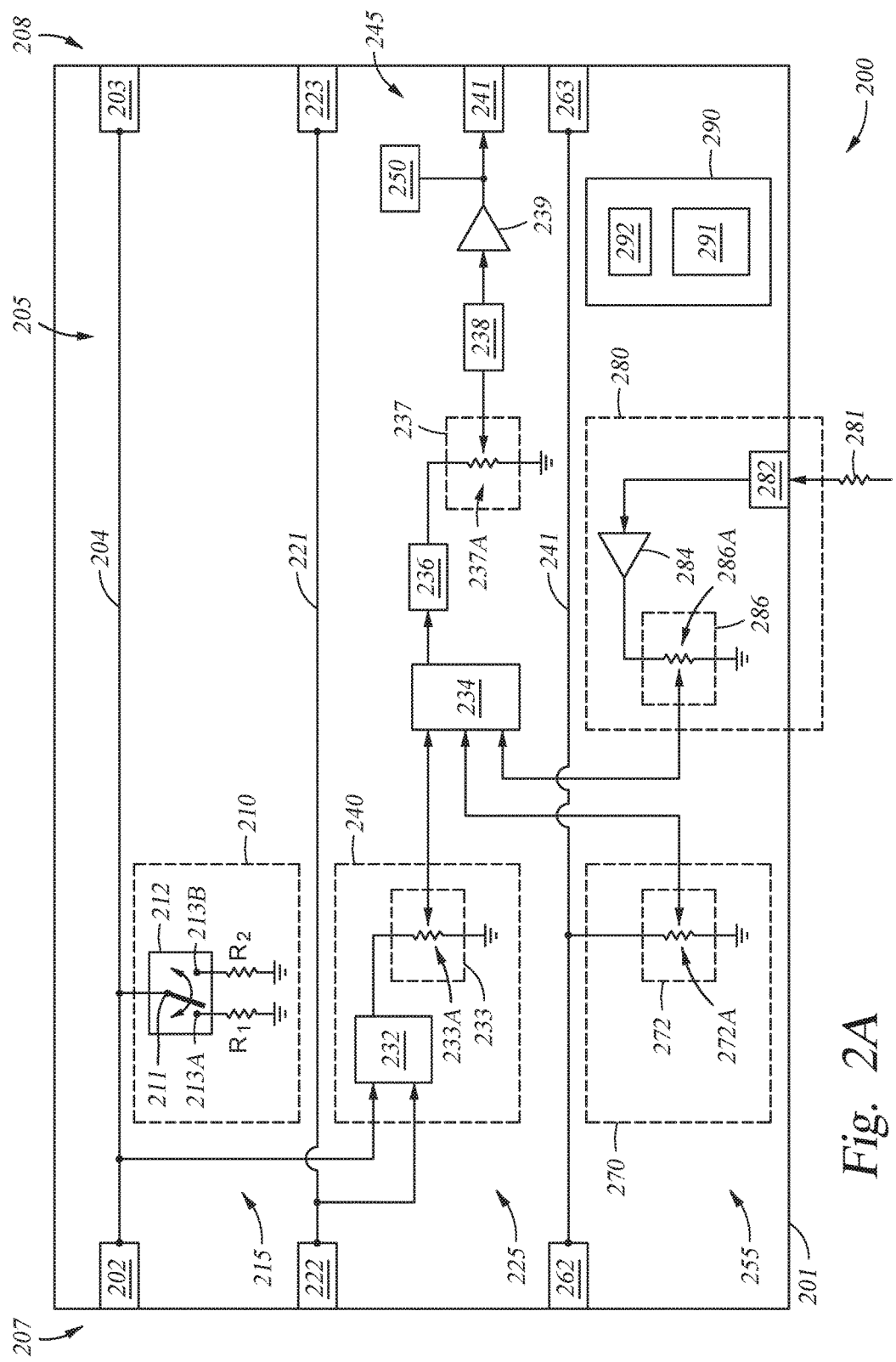
FIG. 2A is a schematic diagram of a signal intercepting device, according to an embodiment of the disclosure.

FIG. 2A is a schematic illustration of an audio signal intercepting device 200 that can be inserted within and/or coupled to one or more of the parts of the sound system, such as the monitor signal connections within the audio monitoring circuit, according an embodiment of the disclosure provided herein. The audio signal intercepting device 200 generally includes an electrical component assembly 205 that includes one or more monitor signal interception elements 215, a signal combining element 225, one or more mixed signal input elements 255, an optional microphone assembly 280 and device supporting elements 290. The audio signal intercepting device 200 also includes a housing 201 that includes an input connection region 207 and an output connection region 208 through which the various connections to a venue's sound system can be made. In some embodiments, the housing 201 includes an internal region that is defined by a plurality of exterior walls. The plurality of exterior walls are configured to enclose the electrical and hardware components found within the audio signal intercepting device 200. In one configuration, the housing 201 is adapted to enclose the various electrical and hardware components required to form the one or more monitor signal interception element 215, signal combining element 225, one or more mixed signal input elements 255, optional microphone assembly 280 and device supporting elements 290.

The input connection region 207 generally includes a plurality of input connection ports, such as ports 202, 222 and 262, that are configured to receive input from one or more input cables that are part of the sound system at a venue. In some embodiments, port 202 is configured to receive a speaker level input signal and port 222 is configured to receive a line level input. In some embodiments, the port 222 is directly connected to port 223 via a pass-through connection 221, and thus allows an audio signal provided to the port 222 to be directly transferred to port 223. In most configurations, it desirable for the pass-through connection 221 to have a low resistance (e.g., <$10^{-3}$ ohms ($\Omega$)) so that the insertion of the audio signal intercepting device 200 within or between connection points within the sound system will not affect the original sound system setup. In some embodiments, port 262 is configured to accept either a speaker level input or line level input that provides a mixture of instrument and/or vocal type of audio inputs that can be combined with the speaker level or line level audio signals received through either port 202 or port 222. The output connection region 208 includes a plurality of output connection ports, such as ports 203, 223, 241 and 263, that are configured to transfer output signals from the audio signal intercepting device 200 to external components found in the sound system at a venue via one or more attached cables. The cables are generally adapted to transmit analog and/or digital signals through one or more shielded electrical conductors between various points in the sound system with minimal electrical interference. The ports 202, 222, 262, 203, 223, 241 and 263 may include an audio connector, such as an RCA connector, an XLR connector, a ¼" connector, a 3.5 mm mini-jack type connector, a TOSLINK connector, BNC connector, or other similar connector that may be used in a typical venue.

Interception Device Supporting Elements

The device supporting element 290 generally includes a power source 291 and optional control and input/output (I/O) components 292 that can provide input to the user when in use and/or allow in some configurations one or more of the processes that are to be performed by or within the audio signal intercepting device 200 to completed in an automated fashion. In some configurations, the power source 291 may include a battery or other similar power generating device. However, in some configurations the power source 291 may form part a standard electrical power input that is received from a wall outlet, or other external power source at a venue.

The control and I/O components 292 will generally include one or more user information providing elements, such as LED lights, LCD display and/or user interface type information providing elements that are able to receive information from one or more of the components in the housing 201 and deliver some form of user information to the performer. The user information may include information relating to one or more the internal signal intercepting device settings, whether a connection has been made, whether a connection is active or inactive, battery level, or other useful information. The one or more user information providing elements may be disposed on one or more sides to the housing 201.

In some configurations, the control and I/O components 292 may also include a processing unit coupled to various input/output (I/O) devices and to a memory unit. Memory unit includes a software application or other useful device information. Processing unit may be any hardware unit or combination of hardware units capable of executing software applications and processing data. For example, processing unit could be a central processing unit (CPU), a digital signal processor (DSP), an application-specific integrated circuit (ASIC), a combination of such units, and so forth. Processing unit is configured to execute software application, process received audio data or other received signals. Memory unit may be any technically feasible type of hardware unit configured to store data. For example, memory unit could be a hard disk, a random access memory (RAM) module, a flash memory unit, or a combination of different hardware units configured to store data. The software application(s) within memory unit includes program code that may be executed by processing unit in order to perform various functionalities associated with controlling or performing a process within the audio signal intercepting device 200. The control and I/O components 292 may also include one or more sensors (not shown) that are configured to sense functional aspects of the connections made to the audio signal intercepting device 200 (e.g., connection has been made, type of connection, etc.) or types of signals received by components within the audio signal intercepting device 200. The sensor data may then be used to perform various functionalities associated with controlling or performing a process within the audio signal intercepting device 200, such as making adjustments to the selected resistance in the impedance controlling element 210, mix parameters (e.g., signal power/sound level) in the signal combining element 225, and/or other useful control adjustments that may be performed within or by the audio signal intercepting device 200.

Monitor Signal Interception Element

The monitor signal interception element 215 generally includes an impedance controlling element 210 and an optional pass-through connection 204. The optional pass-through connection 204 includes a wire, cable or similar conductive element that directly connects port 202 within the input connection region 207 to the port 203 within the output connection region 208. In most configurations, it desirable for the pass-through connection 204 to have a low resistance (e.g., <$10^{-3}$ ohms ($\Omega$)) so that the insertion of the audio signal intercepting device 200 within or between connection points within the audio monitoring circuit, such as within a portion of the input wiring 108 between the mixing board junction box 135 and the first wedge 110A, does not affect the sound output provided by the wedges 110 that remain connected after the insertion of the audio signal intercepting device 200 into the sound system.

Figure 1:
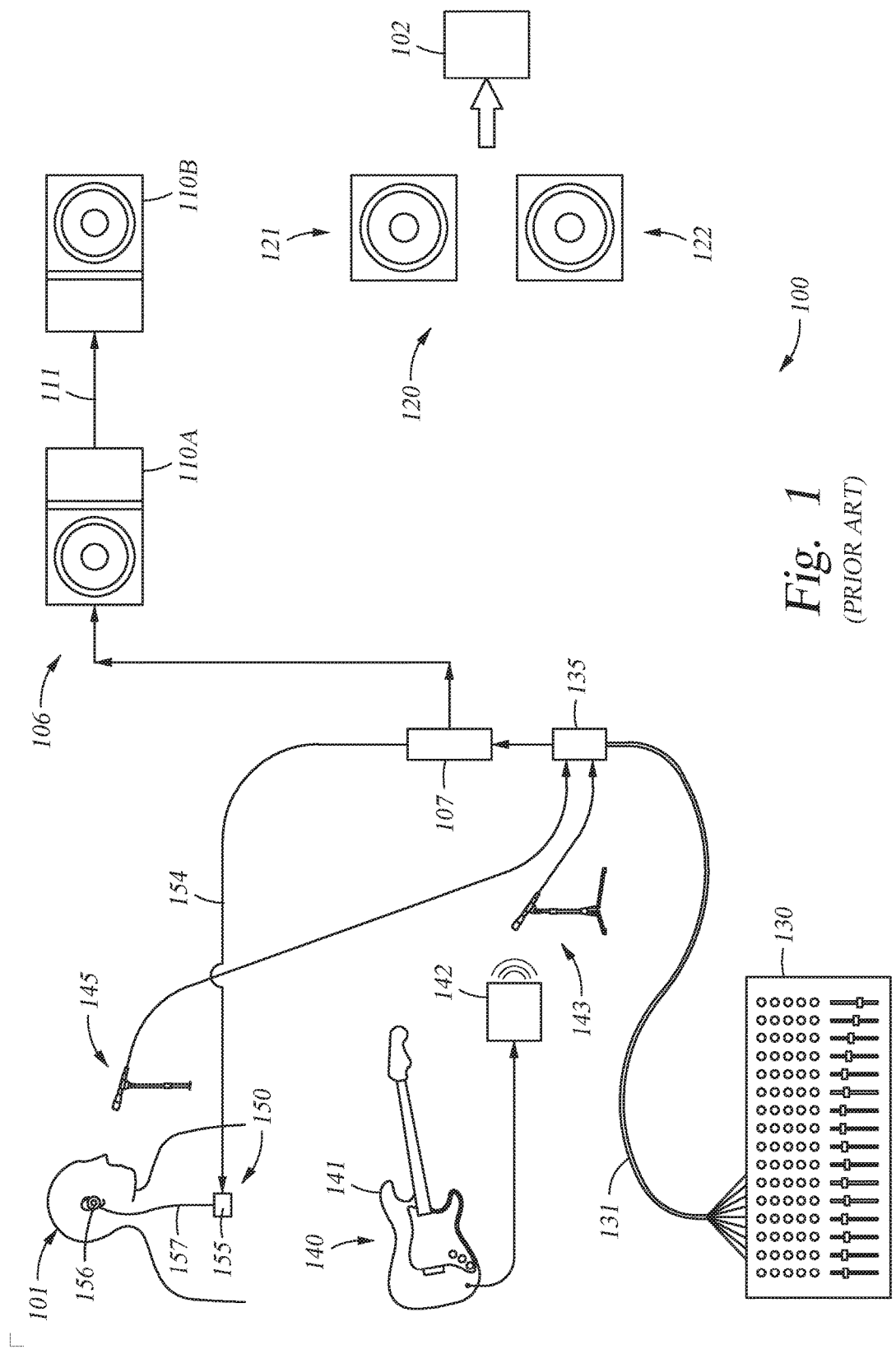
FIG. 1 is a schematic diagram of a conventional sound system a venue.
Figure 2B:
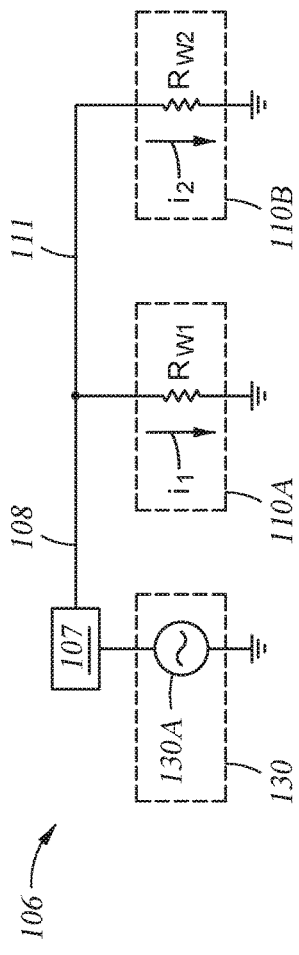
FIG. 2B is a schematic diagram of a portion of an audio monitoring circuit within a sound system that includes two wedge speakers.

FIG. 2B is a schematic of the audio monitoring circuit 106 illustrated in FIG. 1. While the wedges 110A and 110B are schematically illustrated in FIG. 1 as being serially connected by the input wiring 108 and interconnect wiring 111, the wedges 110A and 110B are typically electrically connected in parallel, as shown in the audio monitoring circuit schematic found in FIG. 2B. The input wiring 108 and interconnect wiring 111 may each include an analog and/or digital signal transmitting cable. Therefore, during the delivery of a monitor mix, the source 130A in the mixing board 130 and optional amplifier 107 are configured to deliver the monitor mix signal to the wedges 110A and 110B, which each then separately deliver the monitor mix to a performer that is positioned to receive the audio output from a wedge 110A or 110B. One will note that the sound level in each wedge 110A, 110B may be separately adjusted by a sound engineer during the setup of the sound system, but the audio content of the monitor mix provided to each of the wedges 110A, 110B is identical. During operation a current $i_1$ will flow the resistance $R_{W1}$ found in the wedge 110A and a current $i_2$ will flow the resistance $R_{W2}$ found in the wedge 110B.

Figure 2C:
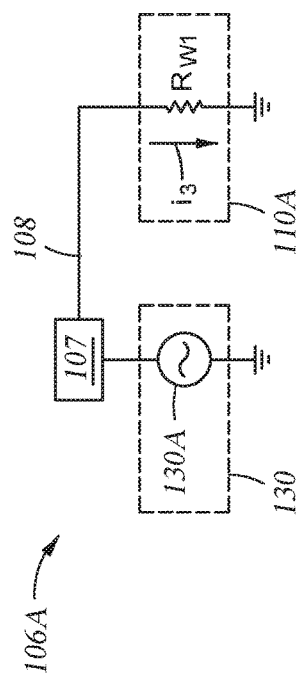
FIG. 2C is a schematic diagram of a portion of an audio monitoring circuit within a sound system that includes a wedge speaker.

FIG. 2C includes a version of the audio monitoring circuit 106 in which the wedge 110B has been removed from the audio monitoring circuit 106. In this configuration, during operation a current $i_3$ will flow through the resistance $R_{W1}$ found in the wedge 110A during a performance. However, if the output power level provided by the source 130A and amplifier 107 remain the same as the power level delivered to the two wedges 110A and 110B, illustrated in FIG. 2B, the output of the wedge 110A will actually decrease due to the increase in impedance created by the removal of the second wedge 110B from the audio monitoring circuit 106. For example, if we assume that resistance $R_{W1}$ and resistance $R_{W2}$ are each about 8 ohms ($\Omega$), then the resistive component of the impedance within the audio monitoring circuit 106 will change by a factor of two (e.g., resistive component changes from 4$\Omega$ to 8$\Omega$), which will dramatically change the sound level provided by the wedge 110A, when the second wedge 110B is removed from the audio monitoring circuit.

In an effort to prevent the need to re-setup the sound system due to the insertion of the audio signal intercepting device 200 and/or removal of one or more of the monitor mix sound producing elements (e.g., wedges 110), the components within impedance controlling element 210 are configured to adjust the impedance within the newly configured audio monitoring circuit to a level that is equal to, or substantially similar to, the impedance level found in the audio monitoring circuit before the audio signal intercepting device 200 was inserted. The impedance controlling element 210 generally include electrical components, such as resistive elements, that can be selectively coupled to port 202 through a switch 212. The impedance controlling element 210 is thus configured to allow the performer to insert the audio signal intercepting device 200 within the audio monitoring circuit and remove any redundant or unwanted monitor mix delivering components from the sound system, such as one or more redundant wedges 110, without affecting the sound level delivered by the remaining wedges 110.

In some embodiments, the switch 212 includes an input connection point 211 that is coupled to the port 202 and one or more output connection points 213, such as output connection point 213A or 213B, which are each coupled to a ground reference through a resistive element. In one example, the switch 212 includes at least two positions that allow the input connection point 211 to be coupled to ground through a first output connection point 213A and a first resistor $R_1$, or coupled to ground through a second output connection point 213B and a second resistor $R_2$. In some embodiments, the resistors within the impedance controlling element 210, such as resistors $R_1$ and $R_2$ are fixed resistors that have been preselected to match various common configurations of a venue's audio monitoring circuit. However, in some embodiments, one or more of the resistors within the impedance controlling element 210 are a variable resistor that can be preset or adjusted as needed to help balance the impedance of the audio monitoring circuit. The selection of the position of switch 212 may be completed by manual adjustment completed by the performer or alternately by electronic means from input from the performer or software rules stored in memory that relate to connection information gathered from the input connection region 207 and/or output connection region 208 connection configurations.

Figure 2D:
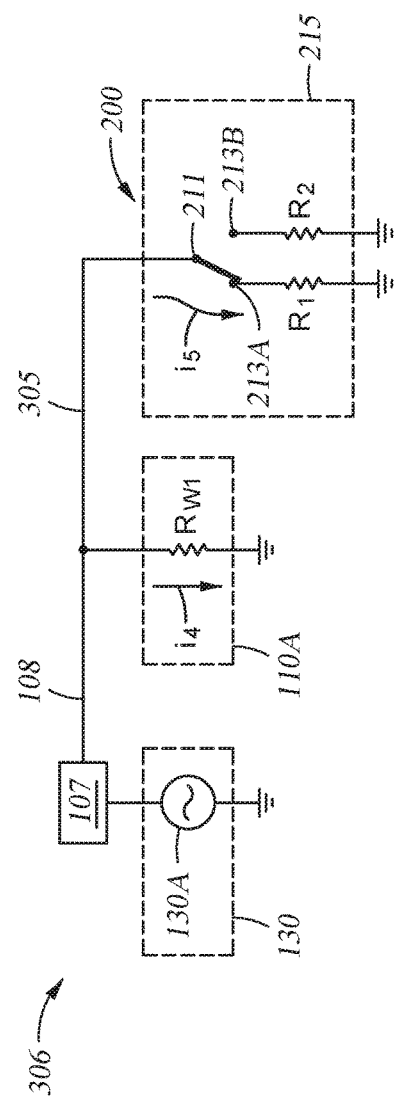
FIG. 2D is a schematic diagram of a portion of an audio monitoring circuit within a sound system that includes an audio signal intercepting device and a wedge speaker, according to an embodiment of the disclosure.
Figure 3:
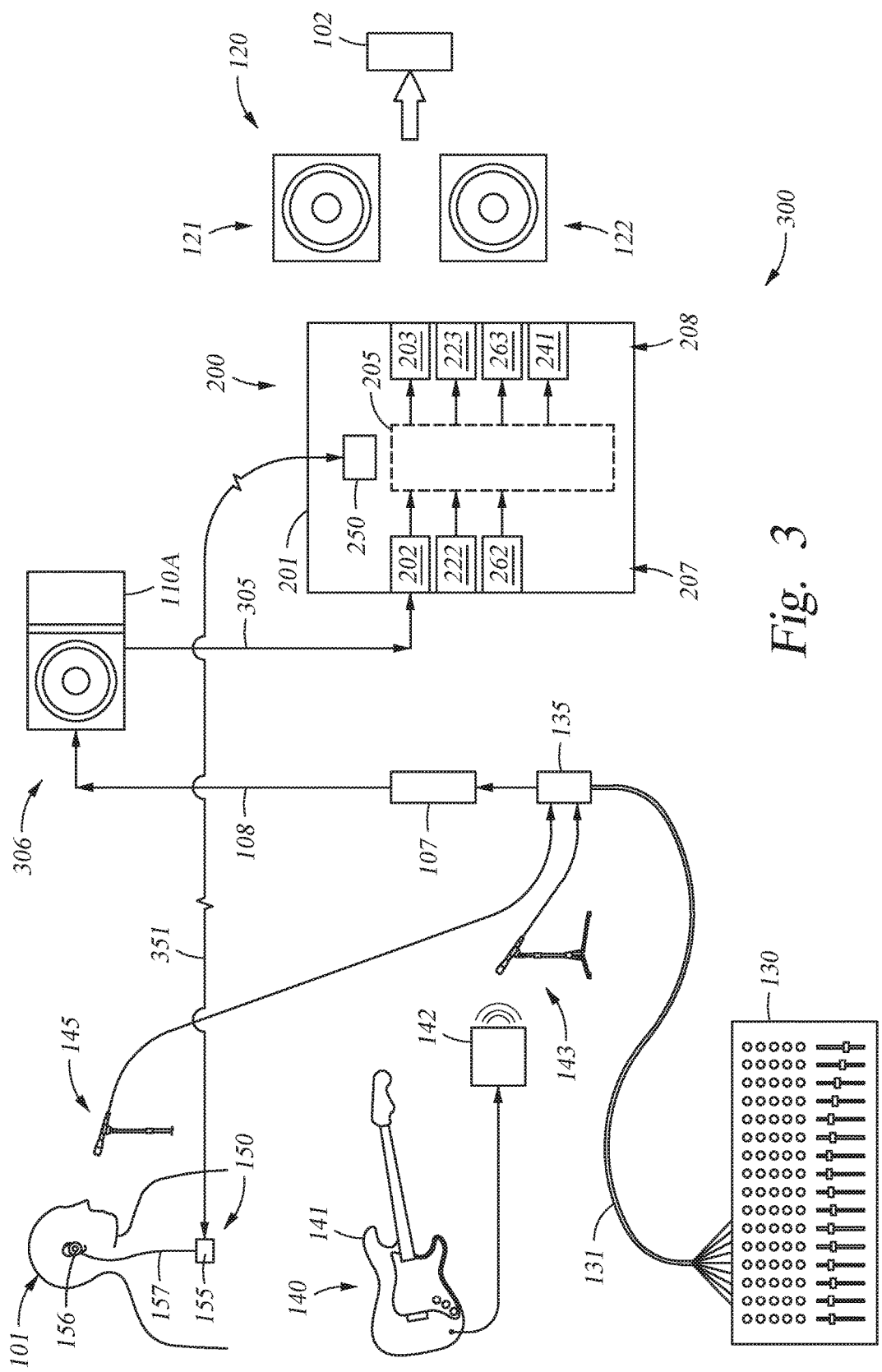
FIG. 3 is a schematic diagram of a sound system at a venue that includes an audio signal intercepting device and a wedge speaker, according to an embodiment of the disclosure.

FIG. 2D illustrates an audio monitoring circuit 306, which is also schematically illustrated in FIG. 3, that contains the impedance controlling element 210. In this example, the audio monitoring circuit 306 is differently configured from the audio monitoring circuit shown in FIG. 2A, since the wedge 110B has been removed from the audio monitoring circuit and the audio signal intercepting device 200 has been inserted in its place. The audio signal intercepting device 200 is connected to the audio monitoring circuit 306 through a cable 305, which in some cases may form part of the interconnect wiring 111. In this configuration, the impedance controlling element 210 is provided to rebalance the impedance within the audio monitoring circuit 306 so that the sound level provided by the remaining wedge 110A is the same or substantially similar to the level provided by its original setup shown in FIG. 2A. During operation a current $i_4$ will flow through the resistance $R_{W1}$ found in the wedge 110A and a current $i_5$ will flow through the resistance $R_1$ found in the impedance controlling element 210. To prevent the insertion of the audio interceptor device 200 from affecting the sound system setup, the generated current $i_4$ is adjusted so that it is equal to or substantially similar to the current shown in FIG. 2A, by correctly selecting the switch 212 position such that the correct resistance $R_1$ (e.g., fixed resistance or adjustable resistance within a range) is selected in the impedance controlling element 210. In this example, if the wedge 110B supplied an 8 ohm load to the audio monitoring circuit then the switch 212 is set to a position that provides about an 8 ohm load (e.g., resistance $R_1$) to re-balance the circuit impedance. In some embodiments, one or more switch settings within the impedance controlling element 210 is able to rebalance the impedance within the audio monitoring circuit 306 such that there is less than about a 10% change in sound level of the remaining sound system audio delivering components (e.g., wedge 110A), such as less than a 5% change in sound level, or even less than a 1% change in sound level.

In some embodiments of the audio signal interception device 200, the communication device 250 is adapted to provide the combined monitor mix audio signal that formed within the audio signal intercepting device 200 to the performer 101 via a communication link 351. While not shown in FIGS. 3, 4, 5 and 6, which are discussed further below, in some cases one or more additional audio sources may be connected to port 262 so that the monitor mix received in port 202 or 222 can be combined with the audio signal received from one of the additional audio sources to form the combined monitor mix audio signal that is delivered to the performer 101 via a communication link 351. In one example, the one or more additional audio sources may include the microphone assembly 280, the performer's microphone 145 and/or one or more instrument inputs 140 (e.g., microphone 143). In some cases, an audio signal generated by the microphone assembly 280 is combined with the monitor mix received through port 202 to form the combined monitor mix audio signal that is delivered to the performer 101 via a communication link 351.

Signal Combining Element

The signal combining element 225 generally includes various electrical components that are configured to receive audio signals from various different sources and combine two or more of the received audio signals to form a custom combined monitor mix that can be provided to a performer. The signal combining element 225 generally includes an optional input select element 240, an audio signal combining element 234 and one or more output signal delivering elements 245. The signal combining element 225 may also include a mute switch 236, a combined signal output adjusting element 237, an equalization element 238 and an in-ear monitor driver 239.

The optional input select element 240 generally includes a switching element 232 and a signal output adjusting element 233. The switching element 232 is a device (e.g., switch) that is able to selectively allow an audio signal provided through port 202 or port 222 to be delivered to the signal combining element 234 when a connection is made to either port 202 or port 222 during the insertion of the audio signal intercepting device 200 within an audio monitoring circuit. The signal output adjusting element 233 includes an electrical component, such as a variable resistor 233A, that is configured to adjust the power level of the audio signal provided to the signal combining element 234 from the select element 232 to a desired level, so that when the audio signal is combined with other input signals it has a desired sound level relative to the other received audio inputs. The output adjusting element 233 may include a knob, adjustment screw or other level adjusting feature that is provided to the performer at the surface of the housing 201 to allow the signal power/sound level to be easily adjusted.

The audio signal combining element 234 is generally configured to receive audio signal inputs from the sound system components connected to port 202, port 222 and/or port 262. As shown in FIG. 2A, the audio signal combining element 234 is configured to receive an audio signal from the input select element 240, a mixed input element 270 and/or a microphone assembly 280, and combine the various received signals to form the combined monitor mix which can be provided to a performer. The audio signal combining element 234 may include analog and/or digital mixing components that may form an audio mix buss, where the various received audio signals are combined.

The mixed input element 270 includes an electrical component 272 that is configured to adjust the power level of the audio signal provided to the signal combining element 234 from port 262 to a desired level, so that when the provided audio signal is combined with the other audio input signals it has a desired sound level relative to the other received audio inputs. The electrical component 272 may include a variable resistor 272A that is able to adjust the power level, and sound level, of the audio signal provided to the signal combining element 234. The electrical component 272 may include a knob, adjustment screw or other level adjusting feature that is provided to the performer at the surface of the housing 201 to allow the sound level to be quickly adjusted.

The microphone assembly 280 is generally configured to receive ambient sound 281 and deliver the received ambient sound information to the audio signal combining element 234, so that the performer can additionally receive audio input that is indicative of the ambient environment in which the audio signal intercepting device 200 is positioned. The microphone assembly 280 includes a microphone 282, an optional amplifier 284 and an electrical component 286. The microphone 282 includes a device that is mounted on the housing 201 and is positioned and configured to convert sound waves received from the environment surrounding the audio signal intercepting device 200 into an electrical signal. The optional amplifier 284 is configured to receive the electrical signal from the microphone 282 and amplify the signal so that it can be combined with other speaker level input signals received by the audio signal combining element 234. In some configurations, the microphone assembly 280 includes an electrical component 286 that is configured to adjust the power level of the electrical signal provided to the signal combining element 234 to a desired level. The electrical component 286 may include a variable resistor 286A that is configured to adjust the power level of the received electrical signal provided from the microphone 282 and/or amplifier 284 before it is provided to the signal combining element 234. The electrical component 286 may include a knob, adjustment screw or other level adjusting feature that is provided to the performer at a surface of the housing 201 to allow the sound level of the microphone input to be quickly adjusted.

The custom combined monitor mix that is generated by combining the received audio signals received by the audio signal combining element 234 can then be delivered to an optional mute switch 236 and combined signal output adjusting element 237. The optional mute switch 236 is switching element that allows the performer to suspend the delivery of the custom combined monitor mix to the one or more output signal delivering elements 245. The optional mute switch 236 can be useful in cases where there is feedback or other unwanted sound phenomenon is occurring in the sound system and/or the performer does not wish to receive the current custom combined monitor mix.

The combined signal output adjusting element 237 is configured to adjust the overall power level of the audio signal provided to the one or more output signal delivering elements 245 so that the sound level of the custom combined monitor mix provided to the performer can be provided at a desired level. The combined signal output adjusting element 237 may include a variable resistor 237A that is configured to adjust the power level of the received audio signal provided from the audio signal combining element 234 before it is provided to the one or more output signal delivering elements 245. The combined signal output adjusting element 237 may include a knob, adjustment screw or other level adjusting feature that is provided to the performer at a surface of the housing 201 to allow the signal power/sound level to be quickly adjusted.

The custom combined monitor mix that is generated by the audio signal combining element 234 is then delivered from the combined signal output adjusting element 237 to an optional equalization element 238 and optional in-ear monitor driver 239. The equalization unit 238 includes an electronic component that is able to adjust the balance between frequency components within the custom combined monitor mix audio signal to provide a desired monitor mix to the performer by use of the one or more output signal delivering elements 245. The in-ear monitor driver 239 is configured to amplify the combined monitor mix audio signal to a desired sound/power level before it is transferred to an audio output device, such as an in-ear monitoring system 150.

The one or more output signal delivering elements 245 may include an output port 241, which can be connected to a cable (e.g., cable 154) that is connected to an audio output device (e.g., in-ear monitoring system 150), or a communication device 250 that is adapted to transmit the combined monitor mix audio signal to a wireless transceiver in the audio output device, or in-ear monitoring system. The communication device 250 may also be coupled to memory unit within the control and I/O components 292 and may include devices capable of receiving input and/or devices capable of providing output. For example, communication device 250 may include one or more transceivers configured to establish one or more different types of wireless communication links with other transceivers residing within the in-ear monitoring system 150. A given transceiver within communication device 250 could establish, for example, a Wi-Fi communication link or a Bluetooth® communication link, among other types of communication links with the in-ear monitoring system 150.

Sound System Configuration Examples

Figure 4:
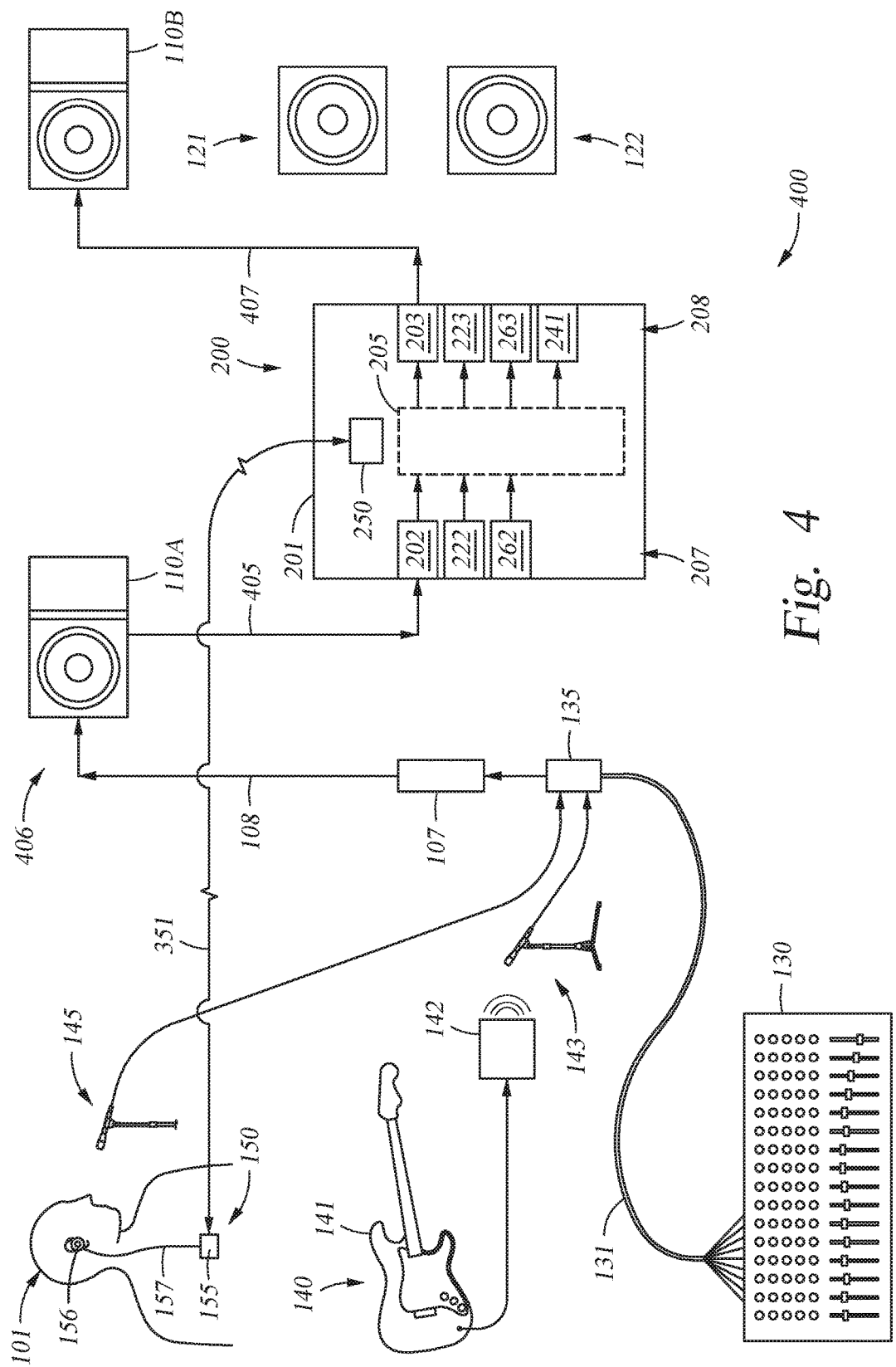
FIG. 4 is a schematic diagram of a sound system at a venue that includes an audio signal intercepting device and wedge speakers, according to an embodiment of the disclosure.
Figure 5:
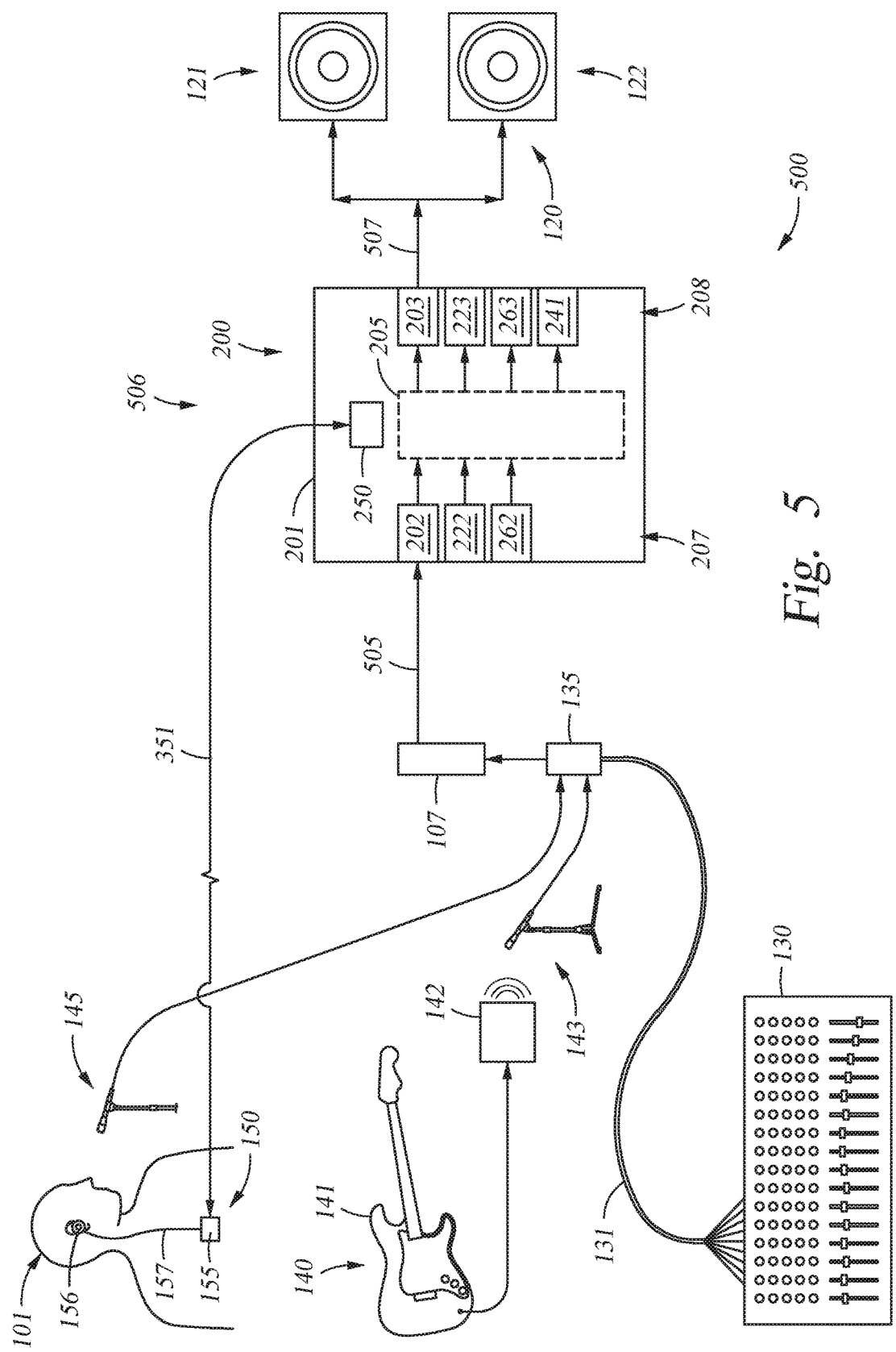
FIG. 5 is a schematic diagram of a sound system at a venue that includes an audio signal intercepting device and house speakers, according to an embodiment of the disclosure.
Figure 6:
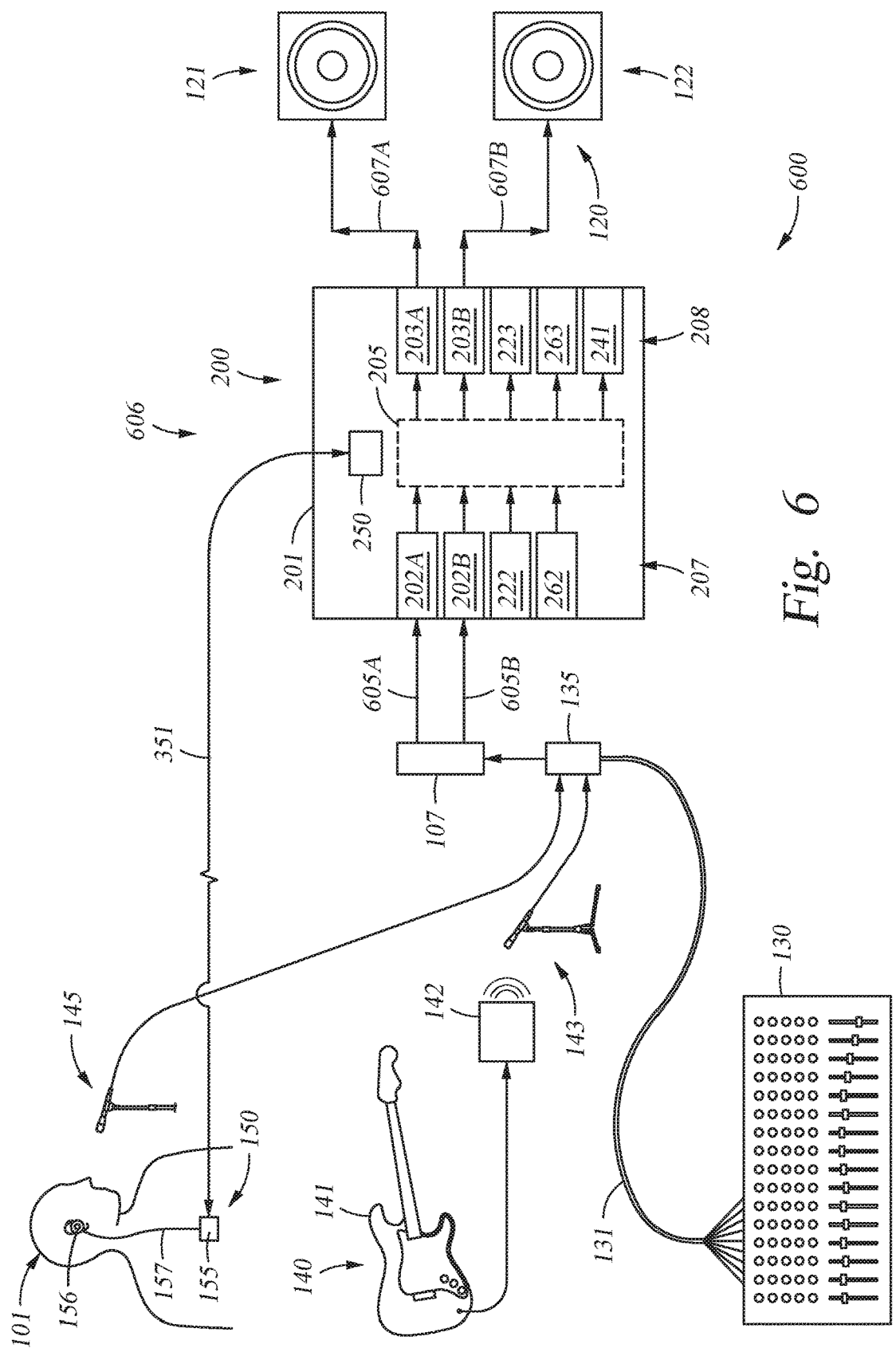
FIG. 6 is a schematic diagram of a sound system at a venue that includes an audio signal intercepting device and stereo house speakers, according to an embodiment of the disclosure.

FIGS. 3 and 4 illustrate configurations of audio monitoring circuits, such as audio monitoring circuits 306 and 406, that are formed by inserting an audio signal intercepting device 200 therein, according to one or more embodiments of the disclosure provided herein. FIGS. 5 and 6 illustrate examples of other sound system configurations that are formed by inserting an audio signal intercepting device 200 therein, according to one or more embodiments of the disclosure provided herein.

FIGS. 2D and 3 schematically illustrate an audio monitoring circuit 306 that includes an audio signal intercepting device 200 that has been inserted therein to replace a monitor, such as wedge 110B, which had been positioned in an original configuration of an audio monitoring circuit (e.g., FIGS. 1 and 2A) at a venue. In this configuration, the port 202 of the audio signal intercepting device 200 has been connected to the audio monitoring circuit 306 via a cable 305. The audio monitoring circuit 306 includes the monitor mix delivering components (e.g., source 130A) in the mixing board 130, the cable 131, one or more connecting components in the junction box 135, the amplifier 107, the input wiring 108, the first wedge 110A, the cable 305 and the audio signal intercepting device 200. During the insertion of the audio signal intercepting device 200 the switch 212 in the impedance controlling element 210 can be set such that the selected resistance will rebalance the impedance within the audio monitoring circuit 306 so that the sound level provided by the remaining wedge 110A is the same or substantially similar to the level provided by its original setup. Knowing the typical resistance of the wedge 110B that is to be removed from the original audio monitoring circuit, the correct switch 212 setting can be selected by the performer. As noted above, in one example, if the wedge 110B supplied an 8 ohm load to the original audio monitoring circuit then the switch 212 can be set to a position that provides about an 8Ω load (e.g., resistance $R_1$) to re-balance the circuit impedance. Therefore, in some embodiments, the switch 212 in the impedance controlling element 210 may include multiple positions that each include different fixed resistances, and/or adjustable resistances that have different resistance ranges, to re-balance the audio monitoring circuit impedance. In one configuration, the switch 212 includes separate switch positions that are configured to select either a 2Ω, 4Ω, 8Ω or 16Ω resistance, which can be used to balance the audio monitoring circuit impedance when at least one 2Ω, 4Ω, 8Ω or 16Ω device is removed from the audio monitoring circuit when the audio signal intercepting device 200 is inserted.

In another example, as shown in FIG. 4, the audio monitoring circuit that has been reconfigured such that the audio signal intercepting device 200 has been positioned between a first wedge 110A and second wedge 110B to form an audio monitoring circuit 406. In this configuration, port 202 of the audio signal intercepting device 200 has been connected to the wedge 110A via a cable 405 and port 203 of the audio signal intercepting device 200 has been connected to the second wedge 110B via a cable 407. The audio monitoring circuit 406 thus includes the monitor mix delivering components (e.g., source 130A) in the mixing board 130, the cable 131, one or more connecting components in the junction box 135, the optional amplifier 107, the input wiring 108, the first wedge 110A, the cable 405, the audio signal intercepting device 200, the cable 407 and the wedge 110B. During the process of inserting the audio signal intercepting device 200, the switch 212 in the impedance controlling element 210 can be set such that the selected resistance will rebalance the impedance within the audio monitoring circuit so that the sound level provided by the wedges 110A and 110B are the same or substantially similar as the level provided in the original setup that did not contain the audio signal intercepting device 200. Depending on the added resistance to ground of the electrical components in the audio signal intercepting device 200, a switch 212 setting can be selected that accounts for the added load created by the insertion of the audio signal intercepting device 200. In one example, a high resistance load setting in the impedance controlling element 210 may need to be selected to prevent the insertion of the audio signal intercepting device 200 from affecting the sound level provided by the wedges 110A and 110B. In one example, the high resistance load setting in the switch 212, such as resistance $R_2$ in FIG. 2A, will provide a 150Ω load. In some embodiments, the switch 212 in the impedance controlling element 210 may include multiple positions that each provide different levels of resistance to ground, such as a high resistance (e.g., >100Ω), a medium resistance (e.g., 16Ω-100Ω) and low resistance (e.g., <16Ω), to re-balance the audio monitoring circuit impedance depending on the audio monitoring circuit configuration created by the insertion of the audio signal intercepting device 200 therein. In one example, one of the positions includes a first resistive element has a resistance that is greater than 100Ω and another one of the positions includes a second resistive element has a resistance that is less than 16Ω.

In some venue sound system configurations the audio monitoring circuit may not be accessible or may not exist, and thus FIGS. 5 and 6 illustrate alternate sound system configurations that will allow a performer to receive a desired custom monitor mix. As shown in FIG. 5, the sound system 500 has been reconfigured such that the audio signal intercepting device 200 has been inserted within the wiring that connects the mixing board 130 to the house speakers 120 to form a speaker audio monitoring circuit 506. The wiring that connects the mixing board 130 to the house speakers 120 can provide an audio signal that is a line level input or a speaker level input to the house speakers 120 to deliver audio content to the audience 102. In one configuration, in which a speaker level input is provided to the house speakers, the port 202 of the audio signal intercepting device 200 can be connected to a cable 505 and port 203 of the audio signal intercepting device 200 can be connected to the house speakers 121, 122 via a cable 507. In another configuration, in which a line level input is provided to the house speakers, the port 222 of the audio signal intercepting device 200 can be connected to a cable 505 and port 223 (not shown) of the audio signal intercepting device 200 can be connected to the house speakers 121, 122 via a cable 507 (not shown). The speaker audio monitoring circuit 506 thus generally includes the house speaker audio delivering components in the mixing board 130, the cable 131, one or more connecting components in the junction box 135, the cable 505, the audio signal intercepting device 200, the cable 507 and the house speakers 121 and 122. The audio signal intercepting device 200 can then take the audio signal provided by the speaker audio monitoring circuit 506 components and combine it with other additional audio sources, such as a performer's microphone 145 or the microphone assembly 280, to form a combined monitor mix audio signal that can then be delivered to the performer 101 via the in-ear monitoring system 150 via a communication link 351. However, depending on the added resistance to ground of the electrical components in the audio signal intercepting device 200, a switch 212 setting may need to be selected that accounts for the added load created by the insertion of the audio signal intercepting device 200 into the speaker audio monitoring circuit 506, which can affect the new sound level of the house speakers. Therefore, in one example, to prevent the audio signal intercepting device 200 from affecting the house speaker sound level, a high resistance load setting in the impedance controlling element 210 may be selected. As noted above, in one example, the high resistance load setting in the switch 212 may provide a 100Ω or greater resistance to ground, such as a 150Ω resistance.

FIG. 6 illustrates another sound system configuration (i.e., sound system 600) that has been reconfigured such that the audio signal intercepting device 200 has been inserted within the wiring that connects the mixing board 130 to a first stereo generating house speaker 121 (e.g., left speaker) and a second stereo generating house speaker 122 (e.g., right speaker) to form a speaker audio monitoring circuit 606. As noted above, the wiring that connects the mixing board 130 to either of the house speakers can provide an audio signal that is a line level input or a speaker level input to deliver audio content to the audience 102. In one configuration, in which a speaker level input is provided to each of the house speakers, a port 202A of the audio signal intercepting device 200 can be connected to a cable 605A and port 203A can be connected to the house speakers 121 via a cable 607A, and a port 202B can be connected to a cable 605B and port 203B can be connected to the house speakers 122 via a cable 607B. One will note that in this example that the audio signal intercepting device 200 includes two separate monitor signal interception elements 215 (not shown) that each will provide a separate audio input signal that have a desired sound level to the mixed signal input element 255 so that a desirable combined monitor mix audio signal can be formed from at least these two audio input signals. However, depending on the added resistance to ground of the electrical components in the audio signal intercepting device 200, a switch 212 setting may need to be selected for each of monitor signal interception elements 215 to account for the added load created by the insertion of the audio signal intercepting device 200 into the speaker audio monitoring circuit 606, which can separately affect the new sound level of each of the house speakers. Therefore, in one example, to prevent the audio signal intercepting device 200 from affecting the house speaker sound level in both house speakers, a high resistance load setting in the impedance controlling element 210 in each monitor signal interception elements 215 can be separately selected. In this example, a high resistance load setting for each of the switches 212 in each monitor signal interception elements 215 may provide a 150Ω or greater resistance to ground.

In another configuration, in which a line level input is provided to each of the house speakers, a port 222A (not shown) of the audio signal intercepting device 200 can be connected to a cable 605A and port 223A (not shown) can be connected to the house speakers 121 via a cable 607A, and a port 222B (not shown) can be connected to a cable 605B and port 223B (not shown) can be connected to the house speakers 122 via a cable 607B. One will note that in the line level input example that the audio signal intercepting device 200 may include two separate audio signal pass-throughs that each will provide a separate audio input signal to the mixed signal input element 255 so that a desirable combined monitor mix audio signal can be formed from at least these two signal inputs. The speaker audio monitoring circuit 606 thus generally includes the house speaker audio delivering components in the mixing board 130, the cable 131, one or more connecting components in the junction box 135, the cables 605A and 605B, the audio signal intercepting device 200, the cables 607A and 607B, and the house speakers 121 and 122.

While the foregoing is directed to embodiments of the present disclosure, other and further embodiments of the disclosure may be devised without departing from the basic scope thereof, and the scope thereof is determined by the claims that follow.

What is claimed is:

1. An audio signal intercepting device, comprising:
   a first input port configured to receive a first input signal from an audio source that is coupled to an audio monitoring circuit;
   a signal combining element that is configured to receive the first input signal from the first input port and generate a first output signal that is derived from the received first input signal;
   an output signal delivering element that is configured to transmit the first generated output signal to a first audio output device; and
   a first impedance controlling element that comprises:
      a switch having at least two positions, the switch comprising an input connection point and a first output connection point, wherein the input connection point is coupled to the first input port; and
      a first resistive element that is coupled between the first output connection point and the ground,
      wherein the switch is configured to selectively couple the input connection point to the first output connection point, and
   wherein the output signal delivering element is configured to transmit the first generated output signal to the first audio output device in each of the at least two positions of the switch.

2. The audio signal intercepting device of claim 1, wherein
   the switch further comprises a second output connection point, and
   the first impedance controlling element further comprises a second resistive element that is coupled between the second output connection point and the ground.

3. The audio signal intercepting device of claim 2, wherein the second resistive element has a higher resistance than the first resistive element.

4. The audio signal intercepting device of claim 2, wherein the second resistive element has a resistance that is greater than 100Ω and the first resistive element has a resistance that is less than 16 Ω.

5. The audio signal intercepting device of claim 2, wherein
the switch further comprises a third output connection point, and
the first impedance controlling element further comprises a third resistive element that is coupled between the third output connection point and the ground.

6. The audio signal intercepting device of claim 2, wherein the first resistive element and the second resistive element each comprise a variable resistor.

7. The audio signal intercepting device of claim 1, wherein the signal combining element is further configured to receive a second input signal, and the first generated output signal is derived from the received first input signal and the second input signal.

8. The audio signal intercepting device of claim 7, further comprising:
a housing that includes an internal region that is configured to enclose the signal combining element, the output signal delivering element and the first impedance controlling element; and
a microphone assembly that is coupled to the housing and is configured to generate the second input signal.

9. The audio signal intercepting device of claim 1, further comprising a second impedance controlling element that includes one or more resistive elements and a switch having at least two positions, wherein each position of the switch of the second impedance controlling element is configured to connect an input of the switch to an electrical ground through a different resistive element of the one or more resistive elements of the second impedance controlling element, and each resistive element of the second impedance controlling element has a resistance greater than 1 Ω.

10. An audio signal intercepting device, comprising:
an input port configured to receive an input signal from an audio source that is coupled to an audio monitoring circuit;
a signal combining element that is configured to receive the input signal from the input port and generate an output signal that is derived from the received input signal;
an impedance controlling element coupled to the input port, the impedance controlling element including a switch having at least two positions, wherein the signal combining element and the impedance controlling element are connected to the input port in parallel with respect to each other; and
an output signal delivering element that is configured to transmit the generated output signal to an audio output device in each of the at least two positions of the switch.

11. An audio signal intercepting device, comprising:
an input port configured to receive an input signal from an audio source that is coupled to an audio monitoring circuit;
a signal combining element that is configured to receive the input signal from the input port and generate an output signal that is derived from the received input signal; an impedance controlling element coupled to the input port, the impedance controlling element including a switch having at least two positions, wherein each position of the switch is configured to connect the input port to an electrical ground through a different resistive element, and each resistive element comprises a variable resistor; and
an output signal delivering element that is configured to transmit the generated output signal to an audio output device in each of the at least two positions of the switch.

12. The audio signal intercepting device of claim 11, wherein each resistive element has a different resistance value.

13. An audio signal intercepting device, comprising:
an input port configured to receive an input signal from an audio source that is coupled to an audio monitoring circuit;
a signal combining element that is configured to receive the input signal from the input port and generate an output signal that is derived from the received input signal; an impedance controlling element coupled to the input port, the impedance controlling element including a switch, wherein the switch comprises at least three positions and each position of the switch is configured to connect the input port to an electrical ground through a different resistive element; and
an output signal delivering element that is configured to transmit the generated output signal to an audio output device in each of the at least three positions of the switch.

14. A method of generating a monitor mix audio signal for use by a performer, comprising:
selecting a first switch setting of a switch of an impedance controlling element within an audio signal intercepting device, wherein
the audio signal intercepting device is connected to an output of an audio source,
a first audio output device of one or more audio output devices is connected to the output of the audio source in a parallel arrangement with respect to the audio signal intercepting device, and
the first switch setting couples the audio source to ground through a first resistance; and
selecting a second switch setting of the switch based on a change in a number of the one or more audio output devices connected to the audio source, wherein
at least one audio output device of the one or more audio output devices is connected to the audio source after the change, and
the second switch setting couples the audio source to ground through a second resistance.

15. The method of claim 14, wherein the change in the number of the one or more audio output devices increases the number of the one or more audio output devices connected to the audio source.

16. The method of claim 14, wherein the first resistance is higher than the second resistance.

17. The method of claim 14, wherein the switch is coupled to ground through a first variable resistor in the first switch setting and through a second variable resistor in the second switch setting.

18. The method of claim 14, wherein the audio signal intercepting device further comprises an input port configured to receive a first input signal from an audio source that is coupled to an audio monitoring circuit, the switch comprises at least three positions and each position of the switch is configured to connect the input port to an electrical ground through a different resistive element.

* * * * *